United States Patent
Assad et al.

(10) Patent No.: US 9,275,168 B2
(45) Date of Patent: Mar. 1, 2016

(54) HARDWARE PROJECTION OF FIXED AND VARIABLE LENGTH COLUMNS OF DATABASE TABLES

(71) Applicant: International Business Machines Corporation, Armonk, NY (US)

(72) Inventors: Sameh W. Assad, Briarcliff Manor, NY (US); Hong Min, Poughkeepsie, NY (US); Bharat Sukhwani, Briarcliff Manor, NY (US); Mathew S. Thoennes, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/946,200

(22) Filed: Jul. 19, 2013

(65) Prior Publication Data

US 2015/0026198 A1    Jan. 22, 2015

(51) Int. Cl.
*G06F 17/30* (2006.01)

(52) U.S. Cl.
CPC .................. *G06F 17/30943* (2013.01)

(58) Field of Classification Search
CPC ...... G06F 17/30943; G06F 17/30477; G06F 17/30289; G06F 17/30442; G06F 17/30; G06F 17/30315; G06F 17/2735; G06F 17/2785; G06F 17/30088; G06F 17/30292; G06F 17/30498; G06F 17/3053; G06F 17/2075; G06F 17/30298; G06F 17/27
USPC ......... 707/754, 755, 758, 745, 705, 736, 756, 707/737, 722, 752, 753, 712, 713, 714, 718, 707/719, 769, 717, 780, 802, 803, E17.002, 707/E17.014, E17.005, E17.044, E17.089, 707/E17.051, E17.017, E17.082, E17.104; 718/103, 104; 716/1, 4, 6, 7; 712/201; 370/392, 389; 703/13, 14, 15, 16, 19, 703/21
See application file for complete search history.

(56) References Cited

U.S. PATENT DOCUMENTS

| | | | |
|---|---|---|---|
| 5,737,595 A * | 4/1998 | Cohen et al. | 707/E17.032 |
| 5,754,556 A | 5/1998 | Ramseyer et al. | |
| 5,758,144 A | 5/1998 | Eberhard et al. | |
| 6,185,555 B1 | 2/2001 | Sprenger et al. | |
| 6,853,385 B1 * | 2/2005 | MacInnis et al. | 345/629 |

(Continued)

FOREIGN PATENT DOCUMENTS

| | | |
|---|---|---|
| JP | 2000181901 A | 6/2000 |
| JP | 2005180958 A | 7/2005 |
| JP | 2011087730 A | 5/2011 |

OTHER PUBLICATIONS

Rene Mueller "Streams on Wires—A Query Compiler for FPGAs"—VLDB '09, Aug. 24-28, 2009, Lyon, France—pp. 1-12.*

(Continued)

*Primary Examiner* — Anh Ly
(74) *Attorney, Agent, or Firm* — Cantor Colburn LLP; Preston Young

(57) ABSTRACT

In an exemplary embodiment of this disclosure, a computer-implemented method includes receiving, at a hardware accelerator, a first instruction to project a first plurality of database rows, where each of the first plurality of database rows has one or more variable-length columns. The first plurality of database rows are projected, by a computer processor, to produce a first plurality of projected rows. This projection is performed at streaming rate.

14 Claims, 5 Drawing Sheets

INPUT ROW

PROJECTED ROW

(56) References Cited

U.S. PATENT DOCUMENTS

| | | |
|---|---|---|
| 7,103,590 B1 | 9/2006 | Murthy et al. |
| 7,505,036 B1* | 3/2009 | Baldwin ................. 345/421 |
| 7,769,577 B2 | 8/2010 | Guenther et al. |
| 7,908,259 B2 | 3/2011 | Branscome et al. |
| 8,244,718 B2 | 8/2012 | Chamdani et al. |
| 2001/0045958 A1* | 11/2001 | Hochmuth et al. ......... 345/619 |
| 2002/0143743 A1 | 10/2002 | Iyer et al. |
| 2004/0117037 A1* | 6/2004 | Hinshaw et al. ............ 700/2 |
| 2004/0122837 A1 | 6/2004 | Lee et al. |
| 2004/0210663 A1* | 10/2004 | Phillips et al. .............. 709/230 |
| 2004/0225744 A1* | 11/2004 | Frossard et al. ............ 709/231 |
| 2004/0250059 A1* | 12/2004 | Ramelson et al. .......... 713/150 |
| 2005/0049996 A1 | 3/2005 | Srinivasan et al. |
| 2006/0018467 A1 | 1/2006 | Steinmetz |
| 2007/0243898 A1 | 10/2007 | Eyre et al. |
| 2008/0189251 A1 | 8/2008 | Branscome et al. |
| 2008/0222136 A1* | 9/2008 | Yates et al. ................. 707/5 |
| 2009/0147787 A1 | 6/2009 | Arulambalam et al. |
| 2009/0254516 A1* | 10/2009 | Meiyyappan et al. 707/E17.017 |
| 2009/0254532 A1* | 10/2009 | Yang et al. ........... 707/E17.014 |
| 2009/0287628 A1* | 11/2009 | Indeck et al. ............... 706/47 |
| 2011/0004883 A1 | 1/2011 | El-Moursy et al. |
| 2012/0047126 A1 | 2/2012 | Branscome et al. |
| 2012/0284492 A1 | 11/2012 | Zievers |
| 2013/0086096 A1* | 4/2013 | Indeck et al. ............... 707/758 |
| 2014/0052713 A1* | 2/2014 | Schauer et al. ............ 707/722 |
| 2014/0052743 A1* | 2/2014 | Schauer et al. ............ 707/754 |
| 2014/0108481 A1* | 4/2014 | Davis et al. ................ 708/607 |
| 2014/0165021 A1* | 6/2014 | Pattichis et al. ............ 716/135 |

OTHER PUBLICATIONS

Bharat Sukhwani et al. "Database Analytics Acceleration using FPGAs" —PACT'12, Sep. 19-23, 2012, Minneapolis, Minnesota, USA. pp. 411-420.*

Arce-Nazario et al., "Reconfigurable Hardware Implementation of a Multivariate Polynomial Interpolation Algorithm": International Journal of Reconfigurable Computing; vol. 2010, Article ID 313479; 14 pages, Dated: Jul. 26, 2010, Apr. 2, 2015.

Garcia et al., "An Overview of Reconfigurable Hardware in Embedded Systems", EURASIP Journal of Embedded Systems, vol. 2006, Article ID 56320, p. 1-19, Dated: Jun. 7, 2006.

* cited by examiner

HARDWARE PROJECTION OF FIXED AND VARIABLE LENGTH COLUMNS OF DATABASE TABLES

BACKGROUND

Various embodiments of this disclosure relate to database management systems and, more particularly, to hardware projection of fixed and variable length columns of database records.

Projection refers to the process of parsing records (i.e., rows) of a database table to select certain fields from the records and arrange them in a specified manner. This is generally performed to report the rearranged fields to an application, or to enable more effective sorting of the records over a sort key that has been arranged as needed in the projection results. In current database management systems (DBMSs), projection is generally performed in software and incurs variable costs on the central processing unit (CPU), depending on the type, length, and position of the columns projected.

SUMMARY

In one embodiment of this disclosure, a computer-implemented method includes receiving, at a hardware accelerator, a first instruction to project a first plurality of database rows, where each of the first plurality of database rows has one or more variable-length columns. The first plurality of database rows are projected, by a computer processor, to produce a first plurality of projected rows. This projection is performed at streaming rate.

In another embodiment, a system includes a hardware accelerator, along with a projection unit that is a part of the hardware accelerator. The hardware accelerator is configured to receive a first instruction to project a first plurality of database rows, where each of the first plurality of database rows has one or more variable-length columns. The projection unit is configured to project the first plurality of database rows to produce a first plurality of projected rows, wherein the projecting is performed at streaming rate.

In yet another embodiment, a computer program product includes a computer readable storage medium having computer readable program code embodied thereon. The computer readable program code is executable by a processor to perform a method. The method includes receiving, at a hardware accelerator, a first instruction to project a first plurality of database rows, where each of the first plurality of database rows has one or more variable-length columns. Further according to the method, the first plurality of database rows are projected to produce a first plurality of projected rows. This projection is performed at streaming rate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure enable offloading projection operations to hardware accelerators. Performing projection in hardware is advantageous for various reasons. When an application issues a database query that indicates projection, performing that projection in hardware formats the data in a way the application requires, thus relieving the host processor of this burden. Secondly, some hardware accelerators are already configured to perform predicate evaluation. Projection can be performed in parallel with predicate evaluation, thus offloading even more computations to the hardware without adding latency or affecting overall throughput. Offloaded projections increase the amount of offloaded computations for a given data transfer, thus better amortizing the costs associated with the data transfer.

Further, projection in hardware provides bandwidth and storage savings. By removing unwanted columns from each database record, projection reduces the amount of data returned to the host processor, thus making optimal use of hardware-to-host bus bandwidth. In the cases where further processing of the rows is required on the hardware and the rows need to be temporarily stored locally on the hardware, projection performed in advance of that storage helps optimize the use of the hardware's memory by reducing the amount of data stored there.

If the database records also need to be sorted on the hardware accelerator, projection may be required to extract the columns that form the sort key, making projection a prerequisite step for the sorting. Thus, hardware acceleration of column projection brings many benefits.

Some embodiments of this disclosure are projection systems that provide the ability to handle column projection of variable length columns in streaming fashion at bus speed. When coupled with other database operations offloaded to a hardware accelerator, this projection can be performed in parallel, thus offloading and accelerating additional database functions without additional latency or throughput degradation.

Figure 1:
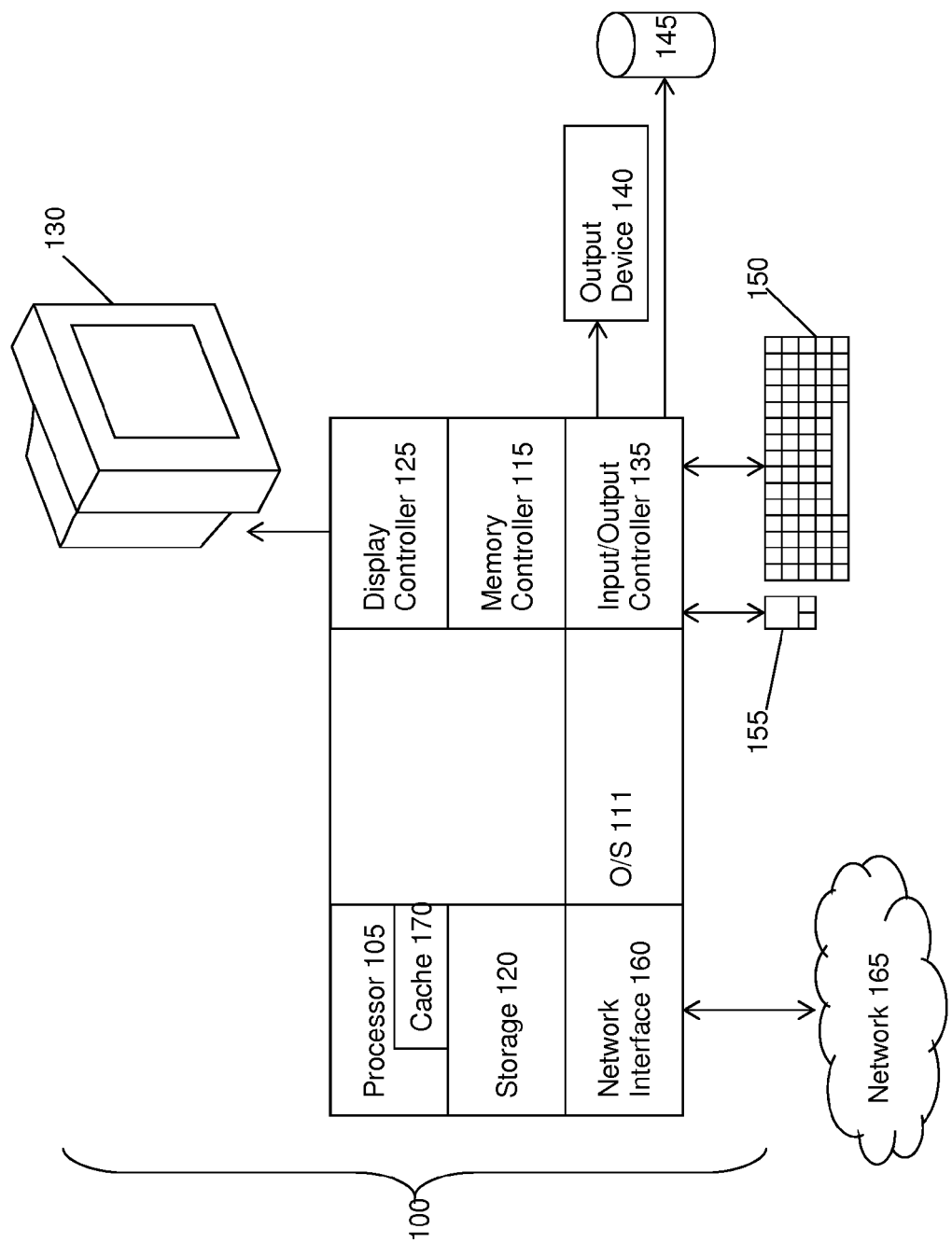
FIG. 1 is a block diagram of a computing device for implementing some or all aspects of a projection system, according to an exemplary embodiment of this disclosure.

FIG. 1 illustrates a block diagram of a computer system 100 for use in implementing a projection system or method according to some embodiments. The projection systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1 , L2 , etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 100, such as that illustrated in FIG. 1.

Figure 2:
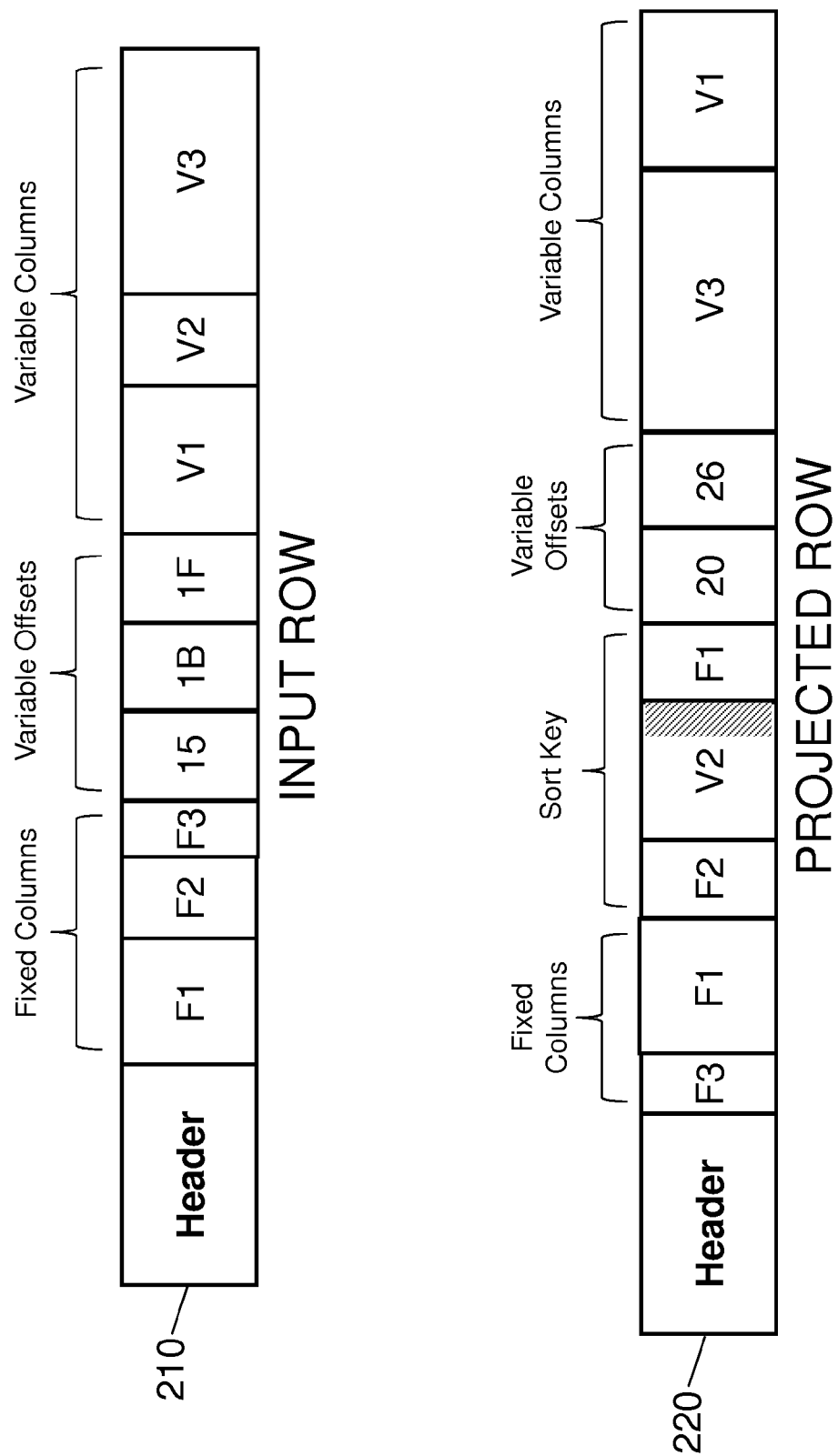
FIG. 2 is a block diagram of an input row and a projected row, as projected by the projection system, according to an exemplary embodiment of this disclosure.

FIG. 2 is a block diagram of an input row 210 and a projected row 220, as projected by the projection system 300 (FIG. 3), according to an exemplary embodiment of this disclosure. As shown, the input row 210 may include fixed-length columns, preceding variable offsets, preceding variable-length columns. Within a single row, the variable offsets indicate the positions of the variable-length columns. It will be understood that, as the lengths of the columns vary, these variable offsets can also vary from row to row.

In some embodiments, projected rows 220 output by the projection system 300 may include one or more columns that have been converted from variable-length, in the input row 210, to fixed-length by addition of padding to reach the maximize column length from among all the rows. An example of such padding is shown by Column V2 of FIG. 2, which has been padded as part of the sort key of the projected row 220. This padding may be particularly useful in cases where the database dictates that fixed columns are needed to meet the requirements of query operations, such as sort or application requirements.

Figure 3:
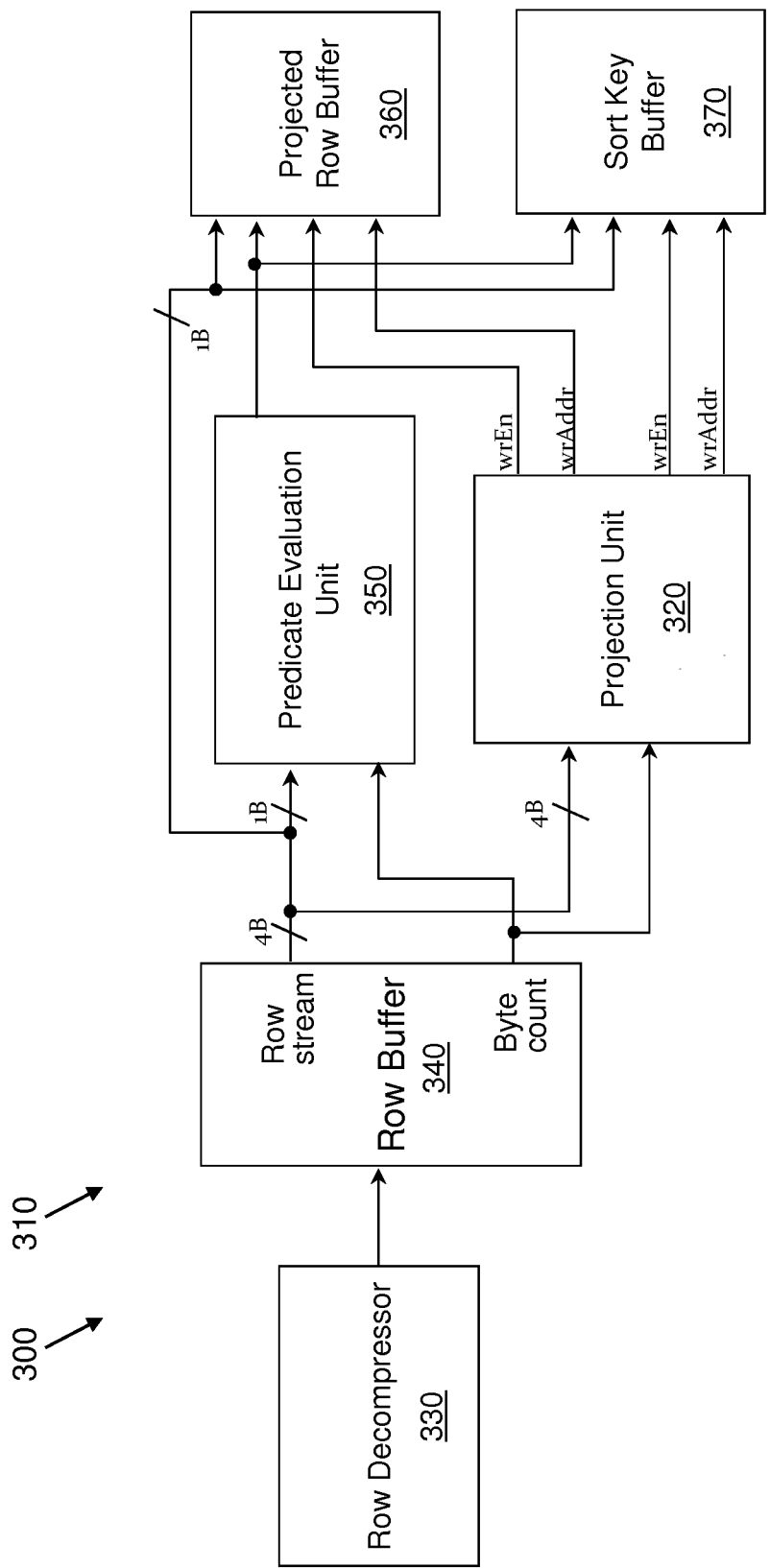
FIG. 3 is a block diagram of the projection system, according to an exemplary embodiment of this disclosure.

FIG. 3 is a block diagram of a projection system 300, according to an exemplary embodiment of this disclosure. This projection system 300 may be embodied in a hardware accelerator 310, to which projection operations are offloaded. For example, and not by way of limitation, one such hardware accelerator 310 may be a field-programmable gate array (FPGA). At streaming rate, the projection system 300 may handle each input row 210 in turn, outputting the resulting projected row 220. In some embodiments, the projection system 300 may use multiple hardware accelerators 310, which may run concurrently. In that case, the host may distribute projection tasks between the multiple accelerators 310 as needed.

A difficulty in projecting at streaming rate arises with the presence of variable-length columns in some database records. Where variable-length columns are used, the length and starting position one or more columns in a row are not fixed and may change across different rows. This length and position information is embedded into the row 210 itself, so extracting this information before projecting the record may require multiple passes through each row. Making multiple passes, however, can significantly slow the projection operation. Exemplary embodiments of the projection system 300 address this by describing a projection operation with a set of projection control elements (PCEs). For each row, the projection system 300 may preprocess the PCEs and resolve the variability of the columns, converting the variable-length columns into a fixed, resolved format. After this resolution is performed, the projection may be performed at streaming rate.

Figure 4:
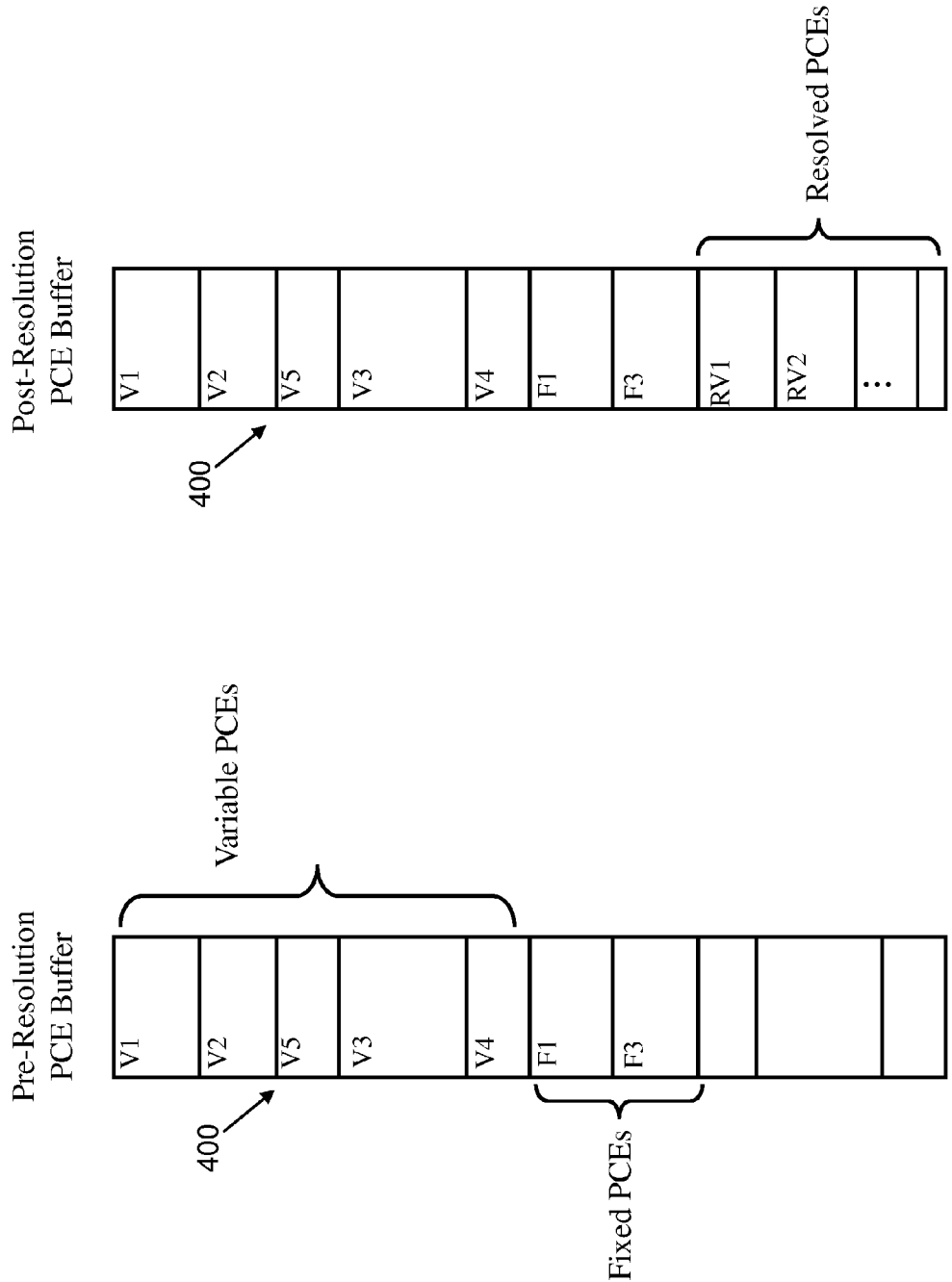
FIGS. 4A and 4B are block diagrams of projection control elements as stored on a hardware accelerator, according to an exemplary embodiment of this disclosure.

Each PCE may represent a column in the database records. Thus, the PCEs may include fixed PCEs, representing fixed-length columns, and variable PCEs, representing variable-length columns. These PCEs may be stored in a PCE memory buffer 400 of the hardware accelerator 310, as shown in FIGS. 4A and 4B. FIGS. 4A and 4B are block diagrams of PCEs used by the projection system 300, according to an exemplary embodiment of this disclosure. More specifically, FIG. 4A shows the PCE buffer 400 prior to resolving the variable-length columns, and FIG. 4B shows the memory buffer after such resolution.

Together, the PCEs may contain information describing the offloaded projection to the accelerator 310. For each projection, a collection of PCEs may describe the requested projection, where each PCE corresponds to a column of the database records. The PCEs may be downloaded once to the accelerator 310, stored in the PCE buffer 400, and then processed by the accelerator 310 to perform the required projection.

Each PCE may provide information about a specific column in the database records to be projected. For a PCE representing a fixed length column, the PCE may contain a field for the column start position and column length, as well as the column start position in the projected row 220 that is to be output. If a sort operation is desired, the PCE may also identify the column's position in the sort key, if included in the sort key. For variable-length columns, because the column length and position are not fixed, the PCE may include similar data except that the position used may be the position of the variable offset, and the column length may be maximum length.

Referring back to FIG. 3, as shown, a projection unit 320 may be integrated with other aspects of the accelerator 310. The accelerator 310 may also include a standard row decompressor 330, row buffer 340, and predicate evaluation unit 350. The projection unit 320 may perform projection at streaming rate, in parallel with predicate evaluation performed by the predicate evaluation unit 350. Results from the projection unit 320 may output to a projected row buffer 360 and a sort key buffer 370, which may perform post-projection processing before returning projected rows 220 to the host. For each byte streamed, the projection unit 320 may use the PCEs to decide whether the byte is to be projected and may generate the appropriate write-enables for the projected row buffer 360 and sort key buffer 370.

To provide beneficial row processing throughput on the accelerator 310, the predicate evaluation logic will generally be designed to process database records without stalling the incoming row stream. Thus, the projection unit 320 may operate at streaming rate as well, so as to maintain the stream of rows 210 through the accelerator 310. Fixed-length columns are amenable to streaming, as the positions and lengths of these columns are known without having to first examine each row. Exemplary embodiments enable this streaming rate processing for variable-length columns as well.

As shown in FIG. 2, the starting position of a variable-length column within a current row may be represented by the column offset that is present as part of the row itself, following the fixed-length columns. If streaming a row without preprocessing using the PCEs, the column offsets might conceivably be streamed first, followed by the variable-length columns. This would make capturing the variable-length columns in a single pass difficult. An exemplary embodiment avoids making multiple passes through a current row 210, where the first pass is used solely to process the variable offsets for computing the positions and lengths of the variable-length columns. An exemplary embodiment also avoids staging the row 210 in a buffer and accessing different pieces of the row as necessary in random order. Rather, an exemplary projection system 300 employs a hybrid technique that enables maintaining both the throughput and the streaming model of row processing.

Referring back to FIG. 4A, at the start of a new query, the PCEs for the fixed length columns may be stored in the lower half of the PCE buffer 400, in the order in which these columns appear in the input rows 210. The PCEs representing the variable-length columns may be stored in the top half of the PCE buffer 400, in the order in which the variable columns are desired to appear in the projected row 220.

When each input row 210 is streamed, the row may first be staged in a temporary row buffer 340. During this staging, the hardware projection unit 320 may iterate through the variable PCEs, which contain pointers to the variable column offsets within the row 210. For each PCE, the pointers may be used to read two column offsets from the row (i.e., for the current and the next variable column). Based on this information, the projection unit 320 may compute the starting position and the length of the current variable-length column represented by the PCE. The starting position is equal to the current column offset, and the length is the difference between the current offset and the next offset. In the input row 210, the destination of the first variable column may be immediately after the last variable offset. This may be a fixed position, as all prior positions in the row 210 are fixed. For subsequent variable columns, the destination of such column may be computed as a sum of the previous variable column position and the length of the previous variable column. For the last variable-length column of the row 210, which may be indicated by a bit in the variable PCE, the length of that column may be computed using the current offset along with the total row length, which can be extracted from the row header.

As the column positions are computed from the PCEs, these positions may be placed into the projected row buffer 360, as they may be needed to interpret the resulting projected row 220, in that these positions point to the start of the projected variable columns. Computation of information relating to each variable-length column may result in resolution of a variable PCE into a fixed, resolved PCE for the current column. For each row in a query, the resolved PCEs may be stored in the lower half of the PCE buffer below the fixed length PCEs, in the order in which they appear in the input row 210.

The act of resolving the PCEs may be performed for each input row 210, before that row is streamed. This resolution adds extra latency to row processing. PCEs may be resolved using a four-stage pipeline, with one PCE being resolved each cycle. Thus, the latency of resolving the PCEs is $p_{var}+4$, where $p_{var}$=number of variable PCEs. This can add significant latency if a large number of variable columns need to be projected, thereby affecting the overall throughput. This time may be at least partially recovered by skipping over the variable column offset data while streaming the row, since after PCE resolution, the offsets are not required for projection or predicate evaluation. With each variable column offset being 2 bytes long, skipping over them reclaims $2*n_{var}$ cycles, where $n_{var}$=number of variable columns in the row. As the number of variable-length columns is necessarily no larger than the number of variable PCEs (which each represent a variable column), than $n_{var}$ is greater than or equal to $p_{var}$. When $p_{var}$ is at least 4, the savings from skipping more than compensate for the extra cycles spent during PCE resolution.

After the variable PCEs have been resolved for a particular row, all the columns may be treated as fixed length, because the start positions and lengths are now known for the variable-length columns in the current input row 210. The current row 210 may then be streamed over the predicate evaluation unit 350 and the projection unit 320, for example, at a rate of one byte per cycle.

While the row is being streamed, the projection unit 320 may step through the resolved PCEs in the bottom half of the PCE buffer 400 and capture the required bytes for projection by comparing the input byte count against the column start position field corresponding to each resolved PCE. With the PCEs being stored in the order in which the corresponding column appears in the input row 210, the projection unit 320 can compare a single PCE at a time to the current row 210 being streamed. After a PCE's corresponding column has been projected for the row 210, the next PCE may be loaded from the PCE buffer 400. To handle the case of multiple consecutive one-byte columns being projected, PCE prefetch logic may be used to allow for a new PCE being loaded every cycle without stalls. Thus, the projection unit 320 may use the PCEs to step through the input row 210 while performing efficient projections of the columns within that row 210.

After the current row 210 is streamed, with output being sent to the projected row buffer 360, the projected row buffer 360 may contain a corresponding projected row 220, along with the fixed and variable length columns as well as the variable column offsets, which were written while resolving the PCEs. The sort key, if any, may then be copied from the sort key buffer 370 into the projected row 220 to completely format the projected row 220 as required. This copying process for the row may be performed when the PCEs for the next row are being resolved, so as not to use more time than needed.

Figure 5:
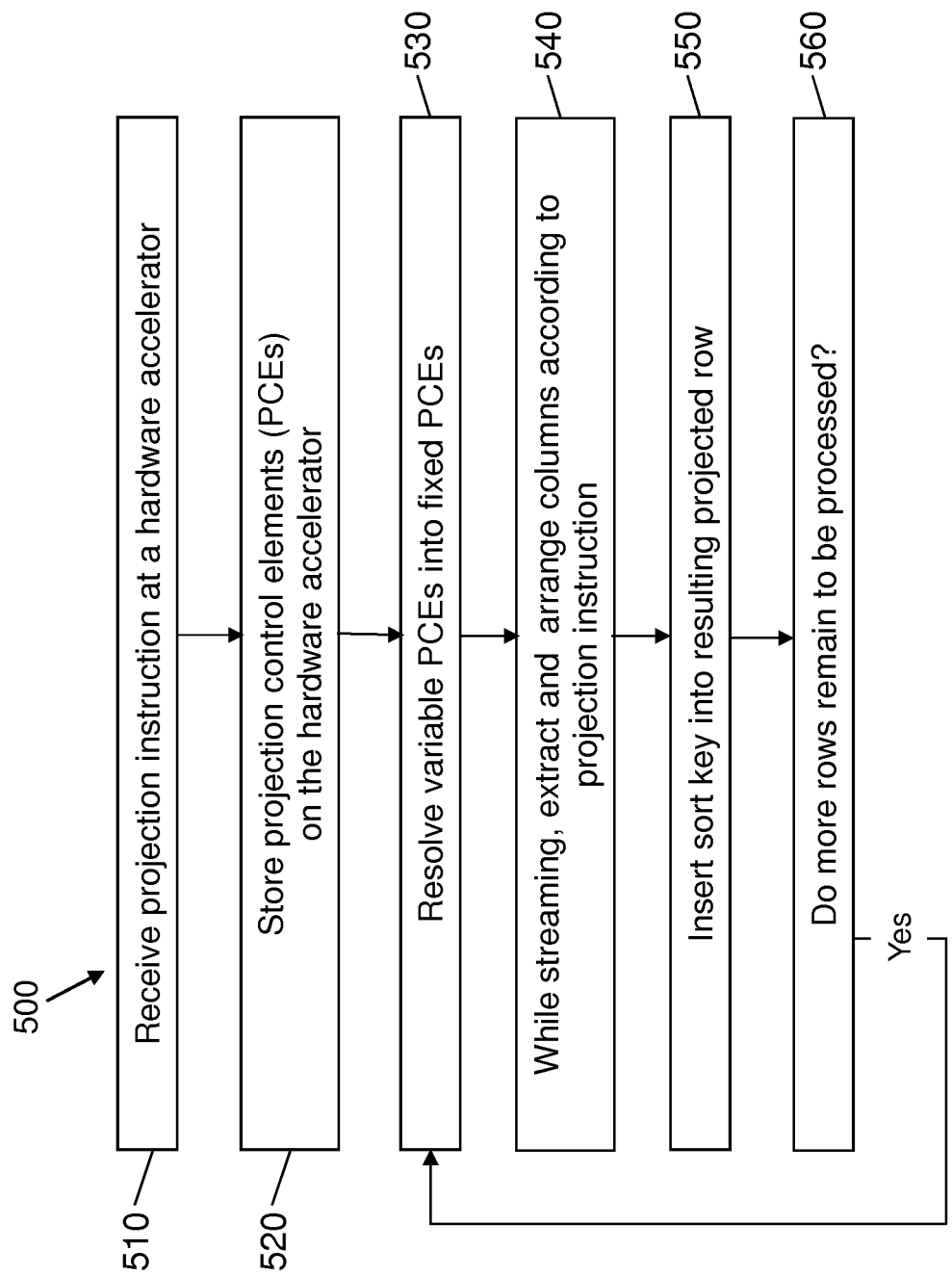
FIG. 5 is a flow diagram of a method for projecting database records, according to an exemplary embodiment of this disclosure.

In summary, FIG. 5 is a flow diagram of a method 500 for projecting database records, according to an exemplary embodiment of this disclosure. At block 510, a projection instruction may be received. At block 520, a set of PCEs representing the various columns of the database records may be stored on the hardware accelerator 310, such as in the PCE buffer 400. At block 530, the variable PCEs for a row may be resolved into fixed PCEs. At block 540, the desired columns may be extracted from the row and arranged according to the projection instruction, based on the information provided in the PCEs. At block 550, the sort key may be inserted into the resulting projected row 220. At decision block 560, it may be determined whether additional rows remain to be processed for the projection. If additional rows remain, the method 500 may return to block 530 to process PCEs for that row.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a hardware accelerator configured to receive a first instruction to project a first plurality of database rows, each of the first plurality of database rows having one or more variable-length columns characterized by a length and a starting position that are not fixed wherein the length, and the starting position for all of the first plurality of database rows are not identical, wherein information regarding the length and the starting position of the variable-length columns is embedded into each of the first plurality of database rows; and
a projection unit of the hardware accelerator, configured to project the first plurality of database rows to produce a first plurality of projected rows, wherein the projecting is performed at streaming rate, wherein the streaming rate is a rate sufficient for the hardware accelerator to project the first plurality of database rows without stalling an incoming row stream.

2. The system of claim 1, wherein the first plurality of database rows have varying total lengths.

3. The system of claim 1, further comprising:
a buffer configured to receive a first plurality of projection control elements based on the first instruction, each projection control element being associated with a database column;
wherein the hardware accelerator is further configured to preprocess each of the first plurality of projection control elements with respect to a first database row having one or more variable-length columns, to determine a fixed position and length corresponding to each variable-length column in the first database row.

4. The system of claim 3, the projection unit being further configured to skip one or more bytes in the first database row while projecting the first database row to produce a first projected row, wherein the skipping reclaims the time used while preprocessing each of the first plurality of projection control elements with respect to the first database row.

5. The system of claim 3, wherein:
the projection unit is configurable, by the first plurality of projection control elements, to comply with the first instruction;
the buffer is further configured to receive a second plurality of projection control elements based on a second instruction; and
the projection unit is configurable, by the second plurality of projection control elements, to comply with the second instruction.

6. The system of claim 1, the projection unit being further configured to provide padding in the one or more variable-length columns in the first plurality of projected rows, to fix the length of each of the variable-length columns.

7. The system of claim 1, the projection unit being further configured to project the first plurality of database rows within a single pass through the first plurality of database rows.

8. A computer program product comprising a non-transitory computer readable storage medium having computer readable program code embodied thereon, the computer readable program code executable by a processor to perform a method comprising:
receiving, by a hardware accelerator, a first instruction to project a first plurality of database rows, each of the first plurality of database rows having one or more variable-length columns characterized by a length and a starting position that are not fixed wherein the length and the starting position for all of the first plurality of database rows are not identical, wherein information regarding the length and the starting position of the variable-length columns is embedded into each of the first plurality of database rows; and projecting, by the hardware accelerator, the first plurality of database rows to produce a first plurality of projected rows;

wherein the projecting is performed at streaming rate, wherein the streaming rate is a rate sufficient for the hardware accelerator to project the first plurality of database rows without stalling an incoming row stream.

9. The computer program product of claim 8, wherein the first plurality of database rows have varying total lengths.

10. The computer program product of claim 8, the method further comprising:

receiving a first plurality of projection control elements based on the first instruction, each projection control element being associated with a database column; and preprocessing each of the first plurality of projection control elements with respect to a first database row having one or more variable-length columns, to determine a fixed position and length corresponding to each variable-length column in the first database row.

11. The computer program product of claim 10, the method further comprising skipping one or more bytes in the first database row while projecting the first database row to produce a first projected row, wherein the skipping reclaims the time used while preprocessing each of the first plurality of projection control elements with respect to the first database row.

12. The computer program product of claim 10, wherein the first plurality of projection control elements configure the hardware accelerator to comply with the first instruction, the method further comprising:

receiving, at the hardware accelerator, a second instruction to project a second plurality of database rows; and receiving a second plurality of projection control elements based on the second instruction, wherein the second plurality of projection control elements -configure the hardware accelerator to comply with the second instruction.

13. The computer program product of claim 8, the method further comprising providing padding in the one or more variable-length columns in the first plurality of projected rows, to fix the length of each of the variable-length columns.

14. A system comprising:

a hardware accelerator configured to receive a first instruction to project a first plurality of database rows, each of the first plurality of database rows having one or more variable-length columns;

a projection unit of the hardware accelerator, configured to project the first plurality of database rows to produce a first plurality of projected rows, wherein the projecting is performed at streaming rate, wherein the streaming rate is a rate sufficient for the hardware accelerator to project the first plurality of database rows without stalling an incoming row stream; and a buffer configured to receive a first plurality of projection control elements based on the first instruction, each projection control element being associated with a database column, and to receive a second plurality of projection control elements based on a second instruction;

wherein the hardware accelerator is further configured to preprocess each of the first plurality of projection control elements with respect to a first database row having one or more variable-length columns, to determine a fixed position and length corresponding to each variable-length column in the first database row, wherein the length and the fixed position for all of the first plurality of database rows are not identical; and the projection unit is configurable to comply with the first instruction by the first plurality of projection control elements and to comply with the second instruction by the second plurality of projection control elements.

\* \* \* \* \*